INVENTORS
ROBERT R. UNTERBERGER
C. DONALD JONES

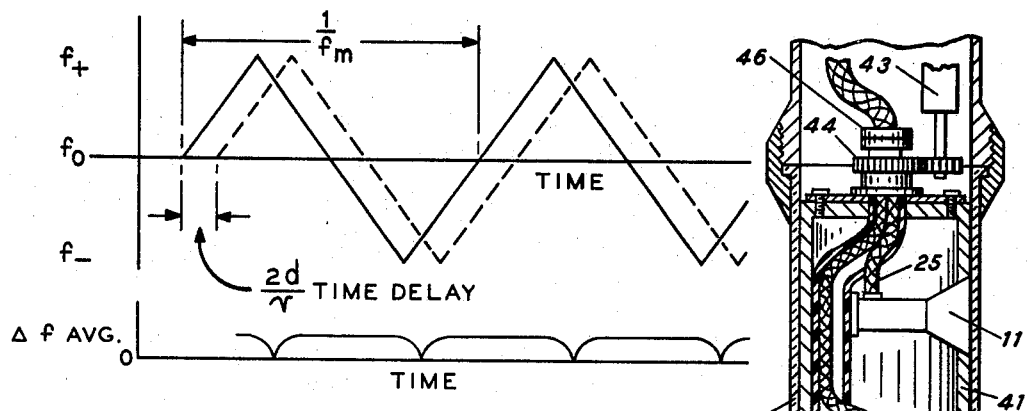
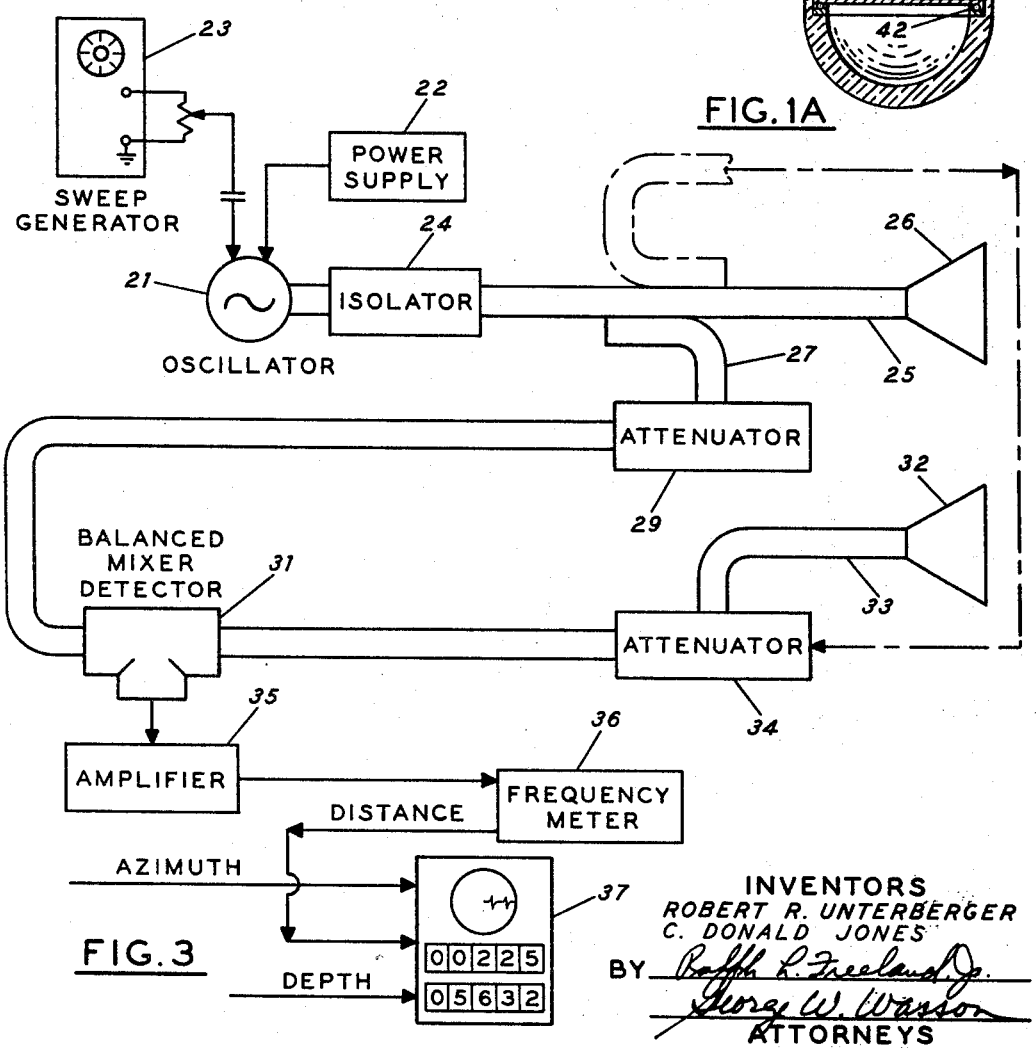

United States Patent Office 3,412,323
Patented Nov. 19, 1968

3,412,323
SUBSURFACE ELECTROMAGNETIC IRRADIATION RANGING METHOD FOR LOCATING FRACTURES WITHIN FORMATIONS
Robert R. Unterberger, Fullerton, and Cullis Donald Jones, San Rafael, Calif., assignors to Chevron Research Company, San Francisco, Calif., a corporation of Delaware
Filed Nov. 14, 1966, Ser. No. 594,079
11 Claims. (Cl. 324—6)

ABSTRACT OF THE DISCLOSURE

Fractures within limestone rock formation that have been permeated by liquid materials having a different dielectric constant than the limestone, are located relative to a well bore penetrating the limestone, but preferably not the fractures, by positioning an electromagnetic wave generator in the well bore having an output signal of variable frequency within a frequency range of $10^6$ to $10^{11}$ cycles per second and modulating the frequency of the output signal through a band width of signals at a rate of repetition determined by the lateral distance expected to be measured. After the formation has been irradiated with the modulated energy, signals coming from the fractures within the limestone formation are detected, and the instantaneous frequency of the transmitted and reflected signals are compared to indicate the frequency difference therebetween. The frequency difference is then converted to lateral distance based on (1) the velocity of transmission of the energy through limestone, (2) the rate of modulation of the output signal, and (3) the band width of the frequency modulation, to locate the fractures as a function of depth along the well bore.

---

This invention relates to a method for locating fractures within tight-rock formations, such as limestone dolomite or sandstone. More particularly, the invention relates to a technique employing the use of electromagnetic irradiation for measuring the lateral distance from a well bore penetrating an earth formation to fractures adjacent to the well bore at the zone of interest.

It has been proposed to detect oil in earth formations by using electromagnetic radiation transmitters and receivers operating at certain selected frequencies either from the earth's surface or from within a well bore. For example, U.S. Patent 2,139,460, G. Potapenko, proposed an electromagnetic radiation system of one or two transmitters and a receiver tuned to the transmitted frequencies. The transmitters generate radio frequency (R.F.) electromagnetic waves of two or more given frequencies and the amplitudes of the received waves at these frequencies are compared with each other to measure their absorption by the earth formations and their contained liquids. The method is based upon the reflection or absorption of the generated waves; the amplitude of the detected signal is measured at the same frequency as a transmitted wave. While such a system is suitable for certain reconnaissance type surveys, that is, where it is desired to know if there is an electromagnetic anomaly within the range of the transmitter and receiver, no attempt has been made to use radio frequency radiations to measure the distance from a fixed location within a well bore to the anomaly lying remotely from the well bore. Such measurement has not been proposed because of the generally accepted belief that no effective transmission of R.F. energy can be obtained through fluid-containing formations around a fluid-filled borehole, particularly where one, or both of said fluids are highly conductive.

More recently it has been proposed to transmit electromagnetic radiation through selected low loss materials within the earth formations and to receive reflections of this energy from remote formations where the dielectric constant of the remote formation is sufficiently different from that of the formation transmitting the energy. A technique of this type for use in a salt dome is disclosed in the copending application of Holser et al., Ser. No. 253,339, for "Method of Mapping a Salt Dome at Depth by Measuring the Travel Time of Electromagnetic Energy Emitted From a Borehole Drilled Within the Salt Dome," filed Jan. 23, 1963.

In the system proposed in the aforementioned copending application, the lateral distances from a well bore within a salt dome to reflecting media at the wall of the dome usually will be far enough to permit pulsed radio frequency energy to be transmitted and adequate time will be available to permit the reception of a reflection of that pulsed energy from the reflecting media. As the distance to the reflector becomes smaller and smaller, the use of pulsed energy is no longer possible since the energy will travel to and return from the reflector before the transmission of the original pulse can be terminated. Transmitting and receiving in this instance cannot be carried on at the same time.

In the particular situation to which the present invention applies; that is, the location of fractures within the earth formations, it is desirable to range for distances from a few feet to as much as 200 feet; these distances generally are too short for utilizing the pulsed radio frequency techniques because of the problem of minimum range for a pulsed radar. For example, in a radar transmitting 0.6 microsecond pulse width in salt, the minimum range is about 120 feet. It is now proposed, in accordance with the method of the present invention, that a frequency modulated (FM) system be employed for determining the lateral distances from the well bore to the reflecting media. Ranging systems of the FM type will permit measurements in the few feet range and can be operated in a manner to accomplish ranging to reflecting zones through earth formations. Furthermore, it has been found that lateral measurements as far as 200 feet may be accomplished with this equipment and this method.

The objects and features of the invention will be readily apparent to those skilled in the art from the specification and appended drawings illustrating a preferred embodiment wherein:

FIGURE 1A is a sectional view through an alternative form of the sonde of the present invention illustrating a means for azimuthally rotating the antennas of the sonde.

FIGURE 2 is a wave form diagram useful in understanding the use of an FM irradiation system for ranging from the well bore to the fractured earth formations.

FIGURE 3 is a schematic diagram of a transmitter and receiver and the associated systems for determining lateral distances in accordance with the method of the present invention.

Figure 1:
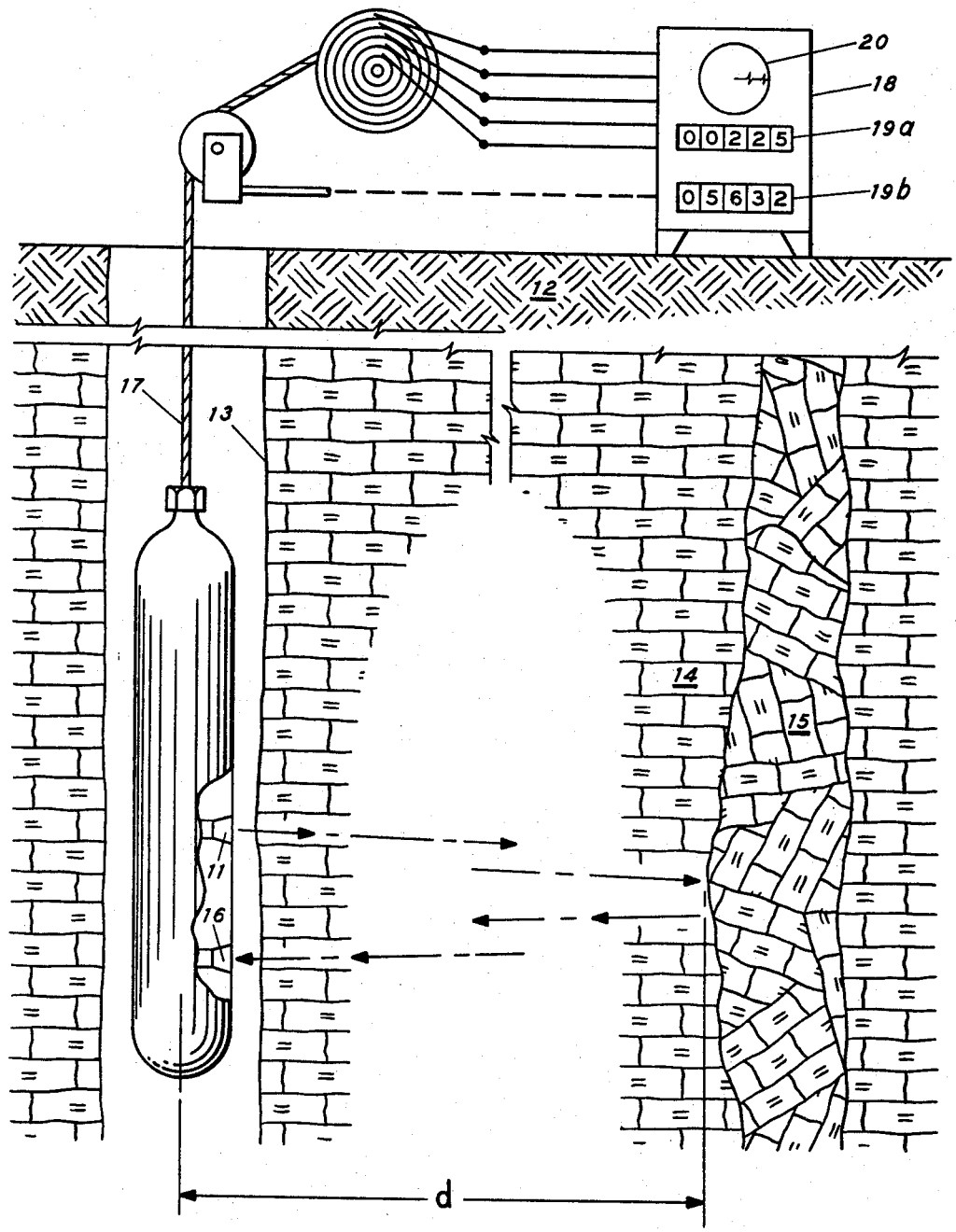
FIGURE 1 is a sectional view of a well bore penetrating an earth formation where fractures are located adjacent to the well bore and illustrates the position of an electromagnetic energy transmitter and receiver within the well bore along with associated equipment at the earth's surface above the penetrated earth formations.

The method of the present invention is proposed for the measurement of lateral distances from a well bore to fractured portions of an earth formation generally as illustrated in FIGURE 1. The ranging technique is accomplished by transmitting energy from the transmitter 11 into an earth formation 12 penetrated by a well bore 13 so that the energy is transmitted through a strata 14 to a fractured portion 15 that may contain fluid material such as oil or water. A portion of the energy incident upon the formation 14 may be reflected from the fractured portion of the material and collected at a receiver 16 for comparison to the transmitted energy to provide for the determination of lateral distance to the reflecting media. The result of the comparison of the transmitted and reflected energy is passed along a portion of cable 17 supporting the transmitter and receiver within the well bore to recording and displaying apparatus 18 at the earth's surface where the depth of the transmitter and receiver within the well bore is recorded on indicator 19a and the lateral distance to the reflector is recorded on indicator 19b. Also shown is an oscilloscope 20 capable of illustrating a time base display of distance to several reflecting formations.

The transmission of energy through subsurface earth formations is described in the aforementioned copending application particularly for transmission through dry salt dome formations. We have found that R.F. energy may be generated within a well bore and transmitted into other low loss earth formations. Examples are coal, anhydrite, sulfur, tight carbonate and in general other nonporous dry formations. Where variations are encountered in these formations that change the real or imaginary (or both) parts of the dielectric constant of the formation, we have found that some of the energy incident upon the formation will be reflected from the interfaces. The present invention is intended for the measurement of distance through a knowledge of time to reflecting interfaces less than 20 feet from the well bore but is useful for measurements as far as 200 feet from the well bore. Beyond this distance the method will still work, for example in dry salt, but that method in the copending patent is more preferable.

In that electromagnetic energy is transmitted through solid substances such as earth formations at a velocity somewhat slower than its velocity through air, the wave length of this transmitted energy is longer in the earth formations than it is in air. In a pulsed R.F. transmission system it has been found that the time required to start and stop the interrogating pulse and to prepare the necessary receiver equipment for reception is so long that the energy can travel through 100 to 300 feet of lateral distance, depending upon the radar pulse width and be reflected to the receiver before the receiver is capable of maximum sensitivity for detecting the reflection. In accordance with the present invention, it is desired to detect the location of fractures at ranges less than the aforementioned distances. It is therefore proposed that an FM ranging system be employed to measure these short lateral distances.

FIGURE 2 illustrates the principle of operation of an FM ranging system. The transmitter of the FM system has a central frequency $f_0$. Its frequency is varied from $f_0$ to $f+$ and $f-$. One cycle of this variation is accomplished at a rate of $f_m$ hertz so that the time to vary the full range of transmitted frequencies is $1/f_m$ seconds. In the length of time that it has taken to transmit energy out to a reflector and for that energy to be reflected back through the formation, the frequency then being transmitted by the transmitter has been changed by a certain finite amount determined by the rate at which the transmitter's frequency is being varied. In FIGURE 2 this time between transmission and reflection is illustrated as the time delay and is represented by the quantity $2d/v$; where $d$ is the distance to the reflector and $v$ is the velocity of transmission of the energy through the formation and is given by $$v = \frac{c}{n} = c\sqrt{E'/E_0}$$

where $c$ is the speed of light, $n$ and $E'/E_0$ are the index of refraction and the real part of the dielectric constant of the formation, respectively. The difference in frequency of the transmitted energy and the reflected energy represents the distance to the reflector and back and may be determined by beating the instantaneous transmitted signal and the received signal one against the other in a suitable mixer. The difference frequency may then be employed to determine the distance to the reflector through a knowledge of the dielectric constant of the intervening formation.

In accordance with the present invention the variation of the transmitter frequency is repeated over a number of cycles. It become possible to measure the average frequency difference between the transmitted and received energy and to continuously record this average difference frequency in terms that relate it to lateral distance to the reflector. It should be noted that while the transmitted frequency is being continuously varied, the reflected signals will have travelled the same distance regardless of frequency and will return to the logging sonde and always be at a frequency different from the transmitted frequency determined by the distance travelled. With the exception of the instant when the signals are the same frequency as the direction of frequency change is reversing, the difference between the signals will represent a measure of the distance to the reflector. Another exception is a returning signal that arrives at a time corresponding to $1/f_m$ after it was transmitted. That situation can be controlled by limiting the range of the tool or by changing $f_m$.

The relationship of the difference in frequency between the transmitted and received signals to range to the reflecting interface is found by the following equation:

Difference in frequency =
rate of change of the changing frequency ×
time between transmission and reflection $$\Delta f = \frac{B}{\frac{1}{2f_m}} \times \frac{2d}{c}$$

which can be written as $$\Delta f = \frac{4f_m B d}{c}\sqrt{E'/E_0}$$

where:

$f_m$ = modulation rate in cycles per second (hertz) of the triangular wave
$B$ = band width in megacycles per second (mHz.)
$d$ = lateral distance to the reflector, and
$c$ = the speed of light in feet per second ($984 \times 10^6$ ft./sec.)
$E'/E_0$ = the real part of the complex dielectric constant (unitless) of the formation traversed by the radar which reduces to $$\Delta f = \frac{f_m B \sqrt{E'/E_0} d}{246}$$

In accordance with the above equation any difference between the frequency of the instantaneously transmitted energy and the returned energy from a reflector can be directly related to the distance to the reflector. For sandstone formations where $E'/E_0$ is 3.78 a lateral distance to a reflector one foot away requires a two-way travel time of 3.9 nanoseconds and the difference in frequency between the transmitted and the received signal is 62.7 c.p.s. Other ranges are as follows where the modulation rate is 115 cycles per second (Hz.) and the band width is 70 megacycles per second (mHz.).

| Distance in feet | Time in nanoseconds | Frequency difference in c.p.s. |
|---|---|---|
| 2 | 7.8 | 125 |
| 3 | 11.7 | 188 |
| 4 | 15.6 | 250 |

For limestone the quantity $E'/E_0$ is about 8.

FIGURE 3 illustrates a schematic diagram of a ranging system for performing the method of the present invention. In this figure an oscillator 21 is energized by power supply 22 to generate the basic frequency for transmission into the earth formation. The oscillator may be a magnetron or klystron capable of operating at the desired frequency and power output. A sweep generator 23 is connected to the oscillator and generates a varying potential at the frequency $f_m$ to cause variation of the output frequency of the oscillator about its center frequency. The output of the oscillator 21 is supplied through a ferrite isolator 24 to a transmission line 25 for transmission to an antenna 26 here shown as a horn. Between the isolator 24 and the antenna is a directional coupler 27 for sampling the transmitted frequency of the oscillator 21. The sampled signal is supplied through an attenuator 29 to the balanced mixer detector 31.

As illustrated in the FIGURE 3 embodiment, a receiving antenna 32 is located adjacent to the transmitting horn antenna 26 and connected through a transmission line 33 to an attenuator 34. The output of attenuator 34 supplies the second input to balanced mixer detector 31 where the transmitted and received signals are mixed to develop a difference frequency. That difference frequency is fed into amplifier 35. A frequency meter 36 measures the frequency of the signal from the balanced mixer detector and supplies that information to a distance measuring device here illustrated as an oscilloscope 37. The frequency meter 36 may also include a low frequency spectrum analyzer that can resolve multiple signals being reflected from more than one horizon by using a narrow band amplifier with a sweeping local oscillator to identify signals at more than one difference frequency.

Another form of transmitter-receiver for the ranging system of of the present invention is shown in phantom in FIGURE 3 and employs a single antenna horn for both transmitting and receiving the electromagnetic energy. Single antenna systems are known in the prior art and are adapted to the present invention with the addition of a double directional coupler with high isolation. This plus dielectric loading of the waveguide would help to reduce the size of the downhole components of the equipment. Another modification of the system of FIGURE 3 but not shown herein is the use of a transmitting antenna horn with waveguide modifications to develop circularly polarized electromagnetic energy. In situations where the present invention is useful it has been found that under certain conditions circularly polarized energy can be transmitted through formations having rather high water content.

It is well understood in the electromagnetic arts that when two signals of different frequencies are mixed, the combination produces four distinct signals; that is, the first signal, the second signal, a signal at the sum frequency of the two signals, and a signal at the difference frequency between the two signals. The signal of interest here is the difference frequency which indicates the change in the frequency of the transmitter between the time energy of a given frequency was transmitted and the time that energy of the same frequency returned to the system. That length of time is the time taken for the electromagnetic energy to travel out to the reflector and back.

While the prior art would indicate that electromagnetic energy cannot be transmitted any appreciable distance through an earth formation, it has now been discovered that electromagnetic energy in certain frequency ranges, such as $10^6$ to $10^{11}$ cycles per second, may be transmitted through consolidated rock formations. Furthermore, we have discovered that even when the formations contain a limited amount of fluids, such as oil or water, transmission can still be accomplished through these formations. In the particular exploration technique of interest here, we have found that electromagnetic energy may be transmitted through tens of feet of limestones or sandstones even with the low porosity (e.g. ½%) saturated with salt water.

One of the particular geological formations that is most difficult to locate with modern exploration techniques is a fracture within tight limestones where the fracture in the zone of interest runs vertically or substantially parallel to a well bore. Modern electrical logs and acoustic velocity logs do not identify the existence of these fractures and certainly do not permit the determination of the lateral distance to the fracture. Nor do these logs give any information about the azimuthal direction of such a fracture. In accordance with the present invention, the logging sonde including the transmitter and receiver for generating and detecting frequency-modulated microwave electromagnetic energy is positioned within a well bore so that energy may be transmitted from the logging sonde in a lateral direction. When that energy encounters a discontinuity caused by a variation in a dielectric constant, a portion of the incident energy is reflected at the dielectric interface. Such an interface could be the contact between two formations, or a fracture. In the usual case these fractured formations contain more fluid than do the consolidated earth formations and this increased content of fluid causes the variation in dielectric constant.

The frequency of energy reflected to the sonde is then compared to the frequency energy being transmitted at that particular instant, in accordance with the steps previously described, to determine the lateral distance to the fractured formation. The sonde may be held stationary during the logging operation or may be continuously raised through the well bore to provide a continuous log along the well bore.

The sonde or the antenna system may also be provided with suitable mechanisms to accomplish rotation about the axis of the well bore along with an indication at the earth's surface of azimuthal direction of the emitted electromagnetic transmission. With such an adaptation the logging tool performing the method of the present invention will provide a continuous vertical and azimuthal log of the earth formations penetrated by the well bore and will indicate lateral distance and direction to reflecting interfaces, such as fractures, in those formations through which the electromagnetic energy may be transmitted.

A rotating antenna system is illustrated in FIGURE 1A wherein the transmitting and receiving antennas are shown within the sonde 40 supported within a rotatable compartment 41. The compartment is supported on ball-bearing races 42 and is driven in rotation by motor 43 through a suitable gear reduction system 44. The compartment is encolsed within the sonde 40 by a surface 45 that is transparent to the transmitted and received energy. As here illustrated, the transmitting antenna 11 and the receiving antenna 16 are connected by waveguides 25 and 33 respectively to a union journal 46 and then connected to the remainder of the equipment within the sonde. With the system as here illustrated the antennas may be rotated to accomplish the azimuthal ranging to subsurface reflectors. Other suitable adaptations may be provided to rotate the antennas or a single antenna about a horizontal axis to optimize the angle of incidence between the treflector and the energy being transmitted.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:
1. The method of locating fractures from within a limestone rock formation traversed by a well bore wherein the fractured portions of the limestone rock formation are laterally spaced from said well bore which comprises:

positioning in said well bore an electromagnetic wave generator having an output signal of variable frequency within the frequency range of energy that may be transmitted through said limestone rock formation, modulating the frequency of said output signal of said electromagnetic wave generator repeatedly through a band width of signals determined in accordance with the velocity of transmission of said electromagnetic energy through said limestone rock formation, the rate of repetition of said modulation through said band width being determined by the lateral distance expected to be measured, irradiating said limestone formation surrounding said well bore with said modulated electromagnetic energy, simultaneously receiving in said well bore adjacent to said position of said generator reflected electromagnetic energy from said fractures within said limestone formation having a different dielectric constant from that of said limestone formation, and comparing the instantaneous frequency of said transmitted and said reflected signals to each other to detect the frequency difference therebetween, and converting said difference frequency to lateral distance in accordance with the velocity of transmission of said electromagnetic energy through said limestone formation and the rate of modulation of said output signal through said band width.

2. The method of claim 1 wherein said output signal is frequency-modulated about a basic frequency within the range of $10^6$ and $10^{11}$ cycles per second.

3. The method of claim 1 wherein said output signal is frequency modulated through a band width narrower than said $10^6$ cycles per second and not larger than said $10^{11}$ cycles per second, said band width being determined in accordance with the expected distance between said well bore and said fractured portions and being widest for fractures near-in and narrowest for fractures far-out from said well bore.

4. The method of claim 3 wherein said rate of repetition of said modulation through said band width is fixed at a rate determined by the band width of said modulation and the distance to said fractured portions and being a higher rate for narrow band width and a lower rate for wider band width.

5. The method of claim 1 wherein said frequency of said transmitted signal and said frequency of said reflected signal are beat against each other to detect the frequency difference therebetween, and said difference frequency is related to distance in accordance with the velocity of transmission of electromagnetic energy through said limestone formation.

6. The method of locating fractures within a limestone formation traversed by a well bore wherein the fractured portions of the limestone formation are laterally displaced from said well bore substantially parallel to said well bore and wherein said fractured portions have been permeated by liquid materials giving said fractured portions a different dielectric constant than said limestone formation which comprises:

(a) positioning in said well bore a directional electromagnetic wave generator, said generator having an output in the frequency range of $10^6$ to $10^{11}$ cycles per second and being frequency modulated through a band width of at least 70 megacycles at least 115 times per second, (b) irradiating said limestone formation surrounding said well bore with said electromagnetic energy, (c) simultaneously detecting in said well bore and adjacent to said point of transmission the electromagnetic energy in the transmitted band that is reflected from said fractured portions of said limestone formation permeated by said liquid material, (d) comparing the instantaneous frequency of said transmitted energy with the instantaneous frequency of said reflected energy and detecting the frequency difference therebetween, (e) and recording said frequency difference in terms of lateral distance from said well bore to said fractured limestone formation in accordance with the depth of said generator and receiver in said well bore.

7. The method of claim 1 wherein said output signal is within a frequency range of $10^6$ to $10^{10}$ cycles per second and wherein said frequency is varied repetitively through a band width not more than $10^{10}$ and not less than $10^6$ cycles per second wide and at a repetition rate between 100 and $10^6$ times per second.

8. The method of claim 1 wherein said electromagnetic wave generator includes an FM radar transmitter and receiver operating within the range of $10^6$ and $10^{11}$ cycles per second and being modulated about a central frequency and through a frequency band determined by the expected lateral distance from said well bore to said fractured portions.

9. The method of claim 1 wherein said output signal is at a frequency of between 4,400 and 4,200 times $10^6$ cycles per second and said output frequency is modulated repetitively through a band width 70 times $10^6$ cycles per second and at a repetitive rate of 115 times per second.

10. The method of claim 6 with the additional step of rotating said directional generator about a vertical axis and recording directional information with said frequency difference to determine azimuthal direction and distance to said fractured portions of said limestone formation.

11. The method of claim 6 including continuously traversing said directional generator along said well bore and rotating said directional generator about a vertical axis and recording depth and directional information with said frequency difference to determine azimuthal direction, depth and distance to said fractured portions of said limestone formation.

References Cited
UNITED STATES PATENTS 2,139,460 12/1938 Potapenro _____ 324—6 XR
3,286,163 11/1966 Holser et al. _____ 324—6

RUDOLPH V. ROLINEC, *Primary Examiner.*

GERARD R. STRECKER, *Assistant Examiner.*